United States Patent [19]

Sutton

[11] Patent Number: 4,584,327

[45] Date of Patent: Apr. 22, 1986

[54] ENVIRONMENTALLY COMPATABLE HIGH DENSITY DRILLING MUD, CEMENT COMPOSITION OR BLOW-OUT FLUID

[75] Inventor: David L. Sutton, Duncan, Okla.

[73] Assignee: Halliburton Company, Duncan, Tex.

[21] Appl. No.: 738,119

[22] Filed: May 24, 1985

[51] Int. Cl.$^4$ .............................................. C08K 7/16
[52] U.S. Cl. ...................... 523/130; 106/97; 106/104; 106/105; 106/109; 166/285; 166/292
[58] Field of Search ............... 106/97, 104, 105, 109; 166/285, 292; 523/130

[56] References Cited

U.S. PATENT DOCUMENTS

| | | | |
|---|---|---|---|
| 2,298,984 | 10/1942 | Stinson et al. | 252/8.5 |
| 2,609,882 | 9/1952 | Morgan | 106/97 |
| 2,786,531 | 3/1957 | Mangold | 106/97 |
| 3,498,394 | 3/1970 | Goodwin et al. | 175/67 |
| 3,867,128 | 2/1975 | Hancock, Jr. | 75/1 R |
| 3,891,454 | 6/1975 | Cunningham | 106/97 |
| 4,036,657 | 7/1977 | Mehta | 106/104 |
| 4,050,949 | 9/1977 | Lundgren | 106/97 |
| 4,092,407 | 5/1978 | Rohrborn et al. | 423/633 |
| 4,188,232 | 2/1980 | Hall | 106/97 |
| 4,436,681 | 3/1984 | Barczak et al. | 264/67 |
| 4,482,385 | 11/1984 | Satkowski | 106/97 |
| 4,500,670 | 2/1985 | McKinley | 106/97 |
| 4,519,922 | 5/1985 | Sutton et al. | 252/8.5 B |

OTHER PUBLICATIONS

Chemical Abstracts 87: 70761u Weighting Agent for Drilling Muds.

*Primary Examiner*—Paul R. Michl
*Attorney, Agent, or Firm*—Edward F. Sherer

[57] ABSTRACT

An environmentally compatible high density drilling, blow-out control fluid, or cement composition is provided wherein densities between twenty-four (24) and forty (40) pounds per gallon can be achieved. Such preferred fluid is aqueous based, uses a non-toxic gelling agent such as fine iron oxide powder, a coarser first weighting material such as fine iron powder, and a second still coarser weighting material such as iron shot, steel shot or mixtures thereof.

20 Claims, No Drawings

ENVIRONMENTALLY COMPATABLE HIGH DENSITY DRILLING MUD, CEMENT COMPOSITION OR BLOW-OUT FLUID

BACKGROUND OF THE INVENTION

1. Field of the Invention

This invention pertains to environmentally compatible fluids such as drilling muds, blow-out fluids, and cement compositions that can achieve densities up to about forty (40) pounds per gallon (ppg) while retaining such properties necessary to provide adequate pumpability.

2. Description of the Prior Art

During the drilling of deep oil and gas wells, overpressured (or geopressured) zones are occasionally penetrated. Since the pressure gradient of these zones seldom exceeds the hydrostatic pressure of a 2.4 density (20 ppg) heavy drilling fluid is often sufficient to control these overpressured zones. However, such heavy drilling fluids are expensive and are often not effective where the exposed zones have a low parting pressure.

Many problems are incurred when drilling into overpressurized zones with mud too light to hold back the gas pressure. Such resulting conditions range from gasified mud (for low permeability formations), controllable kicks which are successfully stopped by closing blow-out preventors, to uncontrollable blow-outs. To counteract the over-pressurized zones, high density fluid is pumped into the annulus (backside), drill pipe or casing (if no drill pipe is in hole). If successful, hydrostatic fluid pressure control will be established with respect to the over-pressurized zone. In the case of a blow-out, the surface or intermediate casing is often parted exposing the borehole to any proximate fresh water aquifiers. Additionally, during kill operations, there is often a danger the casing will part before control is established. Furthermore, kill operations for blow-outs are not always successful and kill fluids can be blown from the well and sprayed across the countryside. Hence, any toxic chemicals included in the high density fluid could be transmitted through the aquifier, or directly through the blow-out, to the local animal and plant population.

A variety of drilling fluids and weighting agents are presently on the market. Generally, drilling fluids have an aqueous or hydrocarbon base. One principal requirement of a good drilling fluid is that it is able to suspend a sufficient amount of weighting additives so as to meet desired density requirements particularily with respect to preventing gasification and blow-outs, while remaining pumpable. With respect to aqueous base drilling fluids, a variety of water thickeners are also known. Examples are organic materials such as xanthan gums, aluminum containing compositions, such as hydrous aluminum oxide, polyacrylates, polyacrylamides and a variety of cellulose derivatives. Examples of known weighting materials include barite, hematite, calcium carbonate and bentonite. However, combinations of the above result in weighted drilling fluids having a density of generally less than twenty (20) pounds per gallon.

Under certain conditions conventional mud systems can be weighted up to thirty (30) pounds per gallon using galena as the weighting agent. Other carrier fluids such as zinc bromide and calcium bromide can also be used to carry galena. Lead powders have also been used to increase the density of zinc bromide carrier fluids. However, when wells are in communication with an aquifier the use of any metal or soluble material considered toxic is unacceptable. Additionally, the heavy carrier fluid would not be permitted to contain soluble, transmittable bromide and zinc.

With respect to blow-out control fluids, two desired qualities are good pumpability and a sufficiently high density to equilibrate downhole pressures. In blow-out situations environmental considerations receive additional attention since there is a greater likelihood of communication with an aquifier as well as the possibility of expulsion of fluids during blow-out. The density of fluid necessary for equilibration purposes is also dependent upon the well parameters.

Cement compositions, when utilized in oil field applications, must be readily pumpable and must have sufficiently high densities to equilibrate downhole pressures in the subterranean formation. When the formation is in communication with underground water, such as from an aquifier, the use of metals or water-soluble materials considered toxic is unacceptable. In addition, high density cement compositions find further application as buoy ballasts, ship ballasts, and grouting material.

In the art of concrete mixing, particle size interrelationships of the cement, fine sand and coarse aggregate with regard rheology and pumpability properties are a consideration. By adjusting the sand and coarse aggregate particle size distribution, a reduction in the amount of water and cement per unit volume required for good pumpability properties can be reduced. Part of this art is referred to as gap grading. However, it was not previously known whether such principles could be applied to systems where all particles employed are generally smaller than the smallest particle of fine sand in concrete. It was generally anticipated that a point of diminishing returns was already being met with respect to the fine sand particle size.

Therefore, it is a feature of the present invention to provide an environmentally compatible high density fluid which is suitable for use in subterranean drilling and blow-out control, or as a cement composition which is suitable for use in oil field applications or grouting applications, or as a ballast for ships or buoys.

SUMMARY OF THE INVENTION

This invention pertains to compositions for high density suspensions or slurries devoid of materials or chemicals which are considered to be hazardous to the environment, i.e., regarding contamination of aquifiers, land surface or air. Such composition comprises water, minute particle sized non-toxic gelling agents such as red iron oxide fines, and weighting materials such as iron powder or small iron shot, or where very high density fluids are required, i.e. over 31 ppg, combinations of gap-graded weighting materials such as iron powder and iron shot. Resultant suspensions or slurries can be achieved having densities from about 2.9 (24 ppg) to 4.8 (40 ppg), while still being readily pumpable, and showing little or no settling or segregation after remaining static for periods up to forty-eight (48) hours.

The above-described high density composition can further include hydraulic cement having an average particle size in the range of from about 30 to about 200 micrometers.

In the preferred embodiment of this invention, a very fine powder (average particle diameter 0.5 to 10.0 micrometers) of red iron oxide is used as the gelling agent to produce an aqueous suspension or slurry with good static gel strength. A first weighting material is added such as fine iron powder (average particle diameter from about 5 to about 50 micrometers) same being fine enough to require only small amounts of static gel strength, but large enough for the red iron oxide water suspension to act as a fine paste, slurry or gelled fluid phase. Next is included a second weighting material such as iron shot having an average diameter from about 200 to about 300 micrometers and being sufficiently large so that the combination of red iron oxide, iron powder and water acts as a paste or gelled fluid phase with respect to the iron shot. The rheology, including static gel strength, plastic viscosity and yield point, can be further controlled by adding small amounts of known dispersants and viscosifiers. Furthermore, hydraulic cement can be added to the composition to produce a high density composition having cementitious properties.

So that the above-recited features, advantages and objects of the invention, as well as others which will become apparent, are attained and can be understood in detail, more particular description of the invention is set forth below with respect to typical embodiments thereof, but the described embodiments should not be considered limiting of its scope, for the invention may admit to other equally effective embodiments which will be apparent from the description to one of ordinary skill in the art.

DESCRIPTION OF THE PREFERRED EMBODIMENTS

The composition of the present invention includes the first step of mixing fresh water with an environmentally compatible gelling agent having particles small enough for the particle intersurface attraction forces to have a major effect on the slurry rheology. That is to say that the gelling agent particles must be small enough to impart what is known as good static gel strength and a high yield point to the resultant fluid.

Examples of useful gelling agents are iron oxide, oxides of antimony, zinc oxide, barium oxide, barium sulfate, barium carbonate, and hematite and other iron ore. Although it is noted that by themselves, zinc, barium and antimony, might be considered environmentally incompatible, in these forms the chemicals do not tend to degrade. The desired properties of the gelling agent include sufficiently fine particle size, sufficiently high density and sufficient activity or intersurface attraction properties so as to produce a slurry having a static gel strength of at least ten (10) pounds per hundred (100) square feet.

The resultant slurry is then further weighted with the addition of other environmentally compatible weighting materials. If a single weighting material is used, such material should be coarser than the gelling agent. However, if a denser fluid is desired, it has been found that a second still coarser weighting agent can be included to provide still more improved properties with regard density.

In order to prepare a high density fluid having cementitious properties, hydraulic cement is added to the water and gelling agent. The amount to hydraulic cement added is an amount sufficient to produce a slurry containing water, gelling agent, and hydraulic cement having sufficient density and activity or intersurface attraction properties so as to produce a slurry having a static gel strength of at least 10 pounds per hundred square feet. The hydraulic cement increases the static gel strength of the slurry and thus lesser amounts of gelling agent are required to produce the required gel strength. In preparing the cement composition, the percent of water by weight of cement will typically range from between about 40 to 300 percent.

The term "hydraulic cement" as used herein, refers to those in organic materials which set up to a hard monolithic mass under water. Generally, any hydraulic cement can be used in the present invention. Portland cement is generally preferred because of its low cost, availability, and general utility. Portland cements of API Classes A, B, C, H, and G ore the most preferred cements for use in the invention, in most instances, although the other API Classes of cements, such as calcium aluminate and gypsum cement, may be utilized. The characteristics of these cements are described in API Specification For Materials and Testing for Well Cements, API Spec 10 A, First Edition, January 1982, which is hereby incorporated by reference.

Here it might be useful to digress and note that these fluids have particular usefulness as drill muds when fluid loss control additives such as bentonite, cellulose derivatives, polyacrylamides, polyacrylates and the like are added, while also possessing utility as blow-out control fluids. This is particularly true when higher density blow-out fluids are necessary and where environmental compatibility is of concern.

Additionally, the fluid viscosity can be better controlled using commercially available viscosifiers and dispersants, with such addition occurring either before addition of the gelling agent or at latter stage. The variety and amount of the dispersants, viscosifiers, gelling agent and weighting material used will be dictated by the well parameters. When two or more gap graded weighting agents are used, pumpable composition can be obtained with a density of up to about forty (40) pounds per gallon.

In the preferred embodiment, it has unexpectedly been found that when a fine particle gelling agent such as red iron oxide and has an average particle diameter size in the range of 0.5 to 10.0 micrometers, which is small enough for gelling water, i.e. forming a suspension or slurry with good static gel strength and yield point, such resultant fluid is capable of suspending other weighting materials suitable for use as drilling muds and blow-out control agents. For an environmentally compatible fluid, preferred weighting agents would include iron powder and iron or steel shot. The iron powder should be fine enough to require only small amounts of static gel strength but large enough for the red iron oxide water suspension to act as a fine paste or gelled fluid phase. An example of such fine iron powder would have an average particle diameter size of 5 to 50 micrometers. The resultant fine paste or gelled fluid phase is receptive to further weighting. A second desirable weighting material such as iron or steel shot having an average diameter of approximately 200 to 300 micrometers could be added to increase the density of the fluid and reduce the fluids dependency on a single weighting material.

Another unexpected finding was that gap grading of the weighting materials with respect to one another and to the particle size of the gelling agent, results in a pumpable slurry with a greatly increased solid volume/water volume ratio than with weighting materials whose particles are within a single narrow-size range. Hence, optimum results with regard density will be obtained via inclusion of a variety of sizes of weighting material.

If a single weight material is used, such material should be coarser than the gelling agent, having an average particle diameter size of two (2) to twenty (20) times greater than the average particle diameter size of the gelling agent. More specifically, the average particle diameter size of the weighting material should be such that at least ninety (90) percent of the particles are less than three (3) times the average particle diameter size of its own average particle diameter size and no more than ten (10) percent of the weight agent particles have a diameter size greater than fifteen hundreths (0.15) micrometers of its own average particle diameter size.

The preferred embodiment for a higher density fluid (i.e. a fluid achieving a density over about 31 ppg) contemplates inclusion of a second still coarser weighting material. Such second weighting material should have an average particle diameter size of four (4) to twenty (20) times greater than the average particle diameter size of the first weighting material, with no more than ten (10) percent of such second weighting material having a particle size less than fifteen hundreths (0.15) of its own average particle diameter size and with at least ninety (90) percent of such second weighting material having a particle size less than five (5) times its own average particle diameter size.

Dispersants and viscosifiers may be added to provide additional rheology control. An example of such a dispersant is CFR-2 Dispersant, commercially available from Halliburton Services. An example of an acceptable viscosifier is 150 GXR Viscosifier, which is commercially available from Hercules Incorporated. Generally, a dispersant is preferably added to reduce friction so that turbulent flow can be achieved at lower pumping rates, as well as to reduce fluid loss. In general, it is easier to over thin the fluid in question with the dispersant and thereafter use a small amount of viscosifier to elevate the viscosity to a desired level.

This invention does not require the use of two separate weighting agents, but when reviewing the advantages of gap grading, the value of including a coarser degree of the weighting material or in the alternative two separate weighting agents of varied size is evident.

For example, if a fluid contains fine iron powder alone, the maximum density achievable in an adequately pumpable fluid would be limited to about 31 ppg. Additionally, the use of iron or steel shot alone would promote a settling problem that would prevent obtainment of the maximum density achievable with the use of at least two weighting materials of more varied size.

In utilizing the cement compositions for sealing a subterranean formation, a specific quantity of cement slurry is prepared and introduced through the well bore into the formation to be treated. The cement slurry is particularly useful in cementing the annular void space (annulus) between a casing or pipe in the borehole. The cement slurries are easily pumped downwardly through the pipe and then outward and upwardly into the annular space on the outside of the pipe. Upon solidifing, the cement slurry sets into a high strength, high density, composition.

When the cement slurry is utilized in a high temperature environment, such as deep oil wells, set time retarders can be utilized in the cement composition in order to provide ample fluid time for placement of the composition at the point of application.

A particularily desirable use of the high density cement compositions in oil field applications occurs when the bore hole conditions of a well are such as to limit the interval of high density cement which can be utilized for the purpose of controlling a pressurized formation. An example of such a use would be when a weak formation is separated from an over-pressured formation by relatively short intervals.

A preferred high density cement composition has a density of about 29.7 pounds per gallon and comprises the following ingredients:

(a) a gelling agent present in an amount of about 25 parts by weight of cement composition and comprising red iron oxide having an average particle size in the range of from about 2.5 to about 3.0 micrometers;

(b) a first weighting agent present in an amount of about 115 parts by weight of cement composition and comprising hematite having an average particle size in the range of from about 75 to about 85 micrometers;

(c) a second weighting agent present in an amount of about 600 parts by weight of cement composition and comprising hematite having an average particle size in the range of from about 700 to about 800 micrometers;

(d) Portland cement present in an amount of about 100 parts by weight of cement composition and having an average particle size in the range of from about 30 to about 200 micrometers;

(e) water present in an amount of about 80 parts by weight of cement composition; and, (f) a dispersing agent comprising a hydroxyethyl cellulose derivative present in an amount of about 1.5 parts by weight of cement composition.

The following examples are given for illustrative purposes only and are not meant to be a limitation on the subject invention except as indicated by the claims appended hereto. All parts and percentages are by weight unless otherwise indicated.

EXAMPLE I

In an attempt to kill a blow-out gas well, 100 barrels of a 35-pound per gallon fluid were forced into the well followed by 900 barrels of a 25-pound per gallon fluid. These fluids were forced into the well at a rate of at least 50 barrels per minute, and were followed by a cementing stage which included 3,000 sacks of an 18-19 pound per gallon cement. Prior to the blow-out the tubing pressure of the well was about 8500 psi with a shut-in tubing pressure of about 11,000 psi.

The 25-pound per gallon fluid was mixed in batch in the following mixing sequence with the following composition per barrel:

TABLE I

| | (25 lb/gal fluid) | | |
| --- | --- | --- | --- |
| Item | Amount Per Barrel | Density g/cc | Particle Size in Micrometers |
| Water | .498 BBL | | |
| CFR-2 Dispersant | 2.5 lbs | | |
| 150 GXR Viscosifier* | .15 lbs | | |
| Red Iron Oxide | 161 lbs | 4.75 | 1.4 |
| Hi-Dense ® No. 3** | 710 lbs | 5.02 | N/A |

TABLE I-continued (25 lb/gal fluid)

| Item | Amount Per Barrel | Density g/cc | Particle Size in Micrometers |
|---|---|---|---|
| Cement Weight Additive | | | |

*This is a hydroxyethyl cellulose derivative commercially available from Hercules Incorporated.
**Hi-Dense No. 3 cement weight additive is a hematite ore that has been ground to a graded particle-size distribution and commercially available from Halliburton Services.

The 35-pound per gallon fluid was formed by mixing in the provided sequence the following compositions which again are provided in amounts per barrel:

TABLE II (35 lb/gal fluid)

| Item | Amount Per Barrel | Particle Size |
|---|---|---|
| Water | .46 BBL | |
| CFR-2 Dispersant | 2.75 lbs | |
| 150 GXR Viscosifer | .15 lbs | |
| Red Iron Oxide with density of 4.75 g/cc | 232 lbs | 1.4 micrometers |
| Fine Iron Powder with density of 7.75 g/cc | 530 lbs | Less than 5% of the particles have a diameter size greater than 74 micrometers and no more than about 75%-85% of the particles have a particle size less than 44 micrometers. |
| Iron Shot (Grit-50) with density of 7.56 g/cc | 540 lbs | The particle diamter size of 90% of the particles is between 250 and 420 micrometers. |

The fluids were mixed by batch in two ribbon blenders providing 200 barrels of fluid per batch in the case of the 25-pound per gallon fluid and 100 barrels per batch in the case of the 35-pound per gallon fluid. The rheology of the resultant fluids was measured and is provided in Table III.

TABLE III

| Fluid | Rheology | | | | | |
|---|---|---|---|---|---|---|
| | 600* | 300 | 200 | 100 | 6 | 3 |
| 25 lb/gal | 210** | 113 | 79 | 46 | 13 | 11 |
| 35 lb/gal | 283 | 173 | 134 | 90 | 34 | 25 |

*Revolutions per minute using a Fann VG 34A meter.
**Values are in pounds per 100 square feet.

After preparation of the fluids, the 35-pound per gallon fluid was introduced into the well at a rate of about 50 barrels per minute, followed by the 25-pound per gallon fluid at a rate of 90–100 barrels per minute. At this point the well was under control and taking fluid, and was now ready for the cementing stage.

Thereafter, the well was opened and 3,000 sacks of 18–19 pounds per gallon cement were pumped at the rate of 20 barrels per minute.

EXAMPLE II

Experiments were conducted using red iron oxide as a gelling agent in an attempt to find a high density kill fluid. The data from these experiments is provided in Table IV, with results indicating that fluids having a density of 24.8 and 35.0 pounds per gallon were achieved.

TABLE IV

| Test No. | Fluid Base | Type of Solids | Conc. of Solids | Density lbs/gal | Effective Viscosity at 300 rpm | Comments |
|---|---|---|---|---|---|---|
| 1. | 4% KCL | Red Iron Oxide | 0.5 g/cc | 24.8 | 68 cps | Solids separation was detected after 15 minutes. |
| | | Iron Powder | 3.0 g/cc | | | |
| 2. | water | Red Iron Oxide | 0.9 g/cc | 24.8 | 78 cps | 0.14 g/cc CFR-2 dispersant and 0.001 g/cc 150 GXR Viscosifier were added to the water to maintain viscosity |
| | | Hi-Dense ® No.3 Additive | 3.98 g/cc | | | |
| 3. | water | Red Iron Oxide | 1.4 g/cc | 35.0 | 270 cps | 0.017 g/cc CFR-2 dispersant was was added to the water for viscosity maintenance. |
| | | Iron Powder | 3.2 g/cc | | | |
| | | Steel Shot (50 Grit) | 3.3 g/cc | | | |

While particular embodiments of the invention have been described, it will be understood that the invention is not limited thereto, since modifications may be made and will become apparent to those skilled in the art. For example, other environmentally inert compositions such as tungsten, manganese and tin could be substituted for the iron and steel weighting agents above.

What is claimed is:

1. A high density fluid having cementitious properties comprising:
    (a) water;
    (b) a gelling agent selected from the group consisting of oxides of antimony, zinc oxide, barium oxide, barium sulfate, barium carbonate, iron oxide, hematite, other irons ores and mixtures thereof wherein said gelling agent has an average particle diameter size in the range of from about 0.5 to about 10.0 micrometers;

(c) hydraulic cement wherein said hydraulic cement has an average particle size in the range of from about 30 to about 200 micrometers wherein said hydraulic cement and said gelling agent have a physical makeup with regard to fine particle size, high density and intersurface attraction properties sufficient to create a slurry with said water that has a gel strength of at least 10 pounds per 100 square feet;

(d) a weighting material selected from the group consisting of iron powder, hematite, other iron ores, steel shot, tungsten, tin, manganese, iron shot, and mixtures thereof wherein said weighting material has an average particle diameter size of from about 2 to about 20 times the average particle size of the gelling agent; said fluid having a density of from 24 pounds per gallon to about 40 pounds per gallon.

2. The fluid of claim 1 wherein at least 90 percent of the particles of said weighting agent have a particle diameter size less than 3 times the average particle diameter size of said weighting agent and no more than about 10 percent of said material has a diameter size greater than about 0.15 micrometers of its own average particle diameter size.

3. The fluid of claim 2 wherein the gelling agent is iron oxide.

4. The fluid of claim 3 wherein the iron oxide has a density of from about 4.6 to about 5.1 g/cc.

5. The fluid of claim 4 wherein the weighting material is iron powder having an average particle diameter size of from about 5 to about 50 micrometers.

6. The fluid of claim 5 further comprising a second weighting material having an average particle diameter size of from about 200 to about 300 micrometers said second weighting agent being selected from the group consisting of iron shot, steel shot, and mixtures thereof.

7. The fluid recited in claim 6 wherein said second weighting material has an average particle diameter size of from about 4 to about 20 times greater than the average particle diameter size of the first weight material and no more than 10 percent of said second weighting material has a particle size less than 0.15 percent of the average particle diameter size of said second weighting material and at least 90 percent of said second weighting material has a particle size less than 5 times of the average particle diameter size of the second weighting material.

8. The fluid of claim 7 wherein the second weighting material is iron shot.

9. The fluid of claim 8 further comprising an amount of a dispersant effective to increase viscosity to a degree sufficient to permit said fluid to be pumped into a subterranean oil or gas formation at a speed of at least 50 barrels per minute.

10. The fluid of claim 9 further comprising a fluid loss control additive selected from the group consisting of bentonite, polyacrylamide, polyacrylate, and cellulose derivatives.

11. A cementitious composition having a density of about 29.7 pounds per gallon and comprising:
(a) a gelling agent present in an amount of about 25 parts by weight of said composition and comprising red iron oxide having an average particle size in the range of from about 2.5 to about 3.0 micrometers;
(b) a first weighting agent present in an amount of about 115 parts by weight of said composition and comprising hematite having an average particle size in the range of from about 75 to about 85 micrometers;
(c) a second weighting agent present in an amount of about 600 parts by weight of said composition and comprising hematite having an average particle size in the range of from about 700 to about 800 micrometers;
(d) Portland cement present in an amount of about 100 parts by weight of said composition and having an average particle size in the range of from about 30 to about 200 micrometers;
(e) water present in an amount of about 80 parts by weight of said composition; and,
(f) a dispersing agent comprising a hydroxyethyl cellulose derivative present in an amount of about 1.5 parts by weight of said composition.

12. A method of cementing in an annulus between a well casing and a borehole comprising placing in said annulus a cementitious composition comprising:
(a) water;
(b) a gelling agent selected from the group consisting of oxides of antimony, zinc oxide, barium oxide, barium sulfate, other irons ores and mixtures thereof wherein said gelling agent has an average particle diameter size in the range of from about 0.5 to about 10.0 micrometers;
(c) hydraulic cement wherein said hydraulic cement has an average particle size in the range of from about 30 to about 200 micrometers wherein said hydraulic cement and said gelling agent have a physical makeup with regard to fine particle size, high density and intersurface attraction properties sufficient to create a slurry with said water that has a gel strength of at least 10 pounds per 100 square feet; and
(d) a weighting material selected from the group consisting of iron powder, hematite, other iron ores, steel shot, tungsten, tin, manganese, iron shot, and mixtures thereof wherein said weighting material has an average particle diameter size of from about 2 to about 20 times the average particle size of the gelling agent; said cementitious composition having a density of from 24 pounds per gallon to about 40 pounds per gallon.

13. The method of claim 12 wherein at least 90 percent of the particles of said weighting agent have a particle diameter size less than 3 times the average particle diameter size of said weighting agent and no more than about 10 percent of said material has a diameter size greater than about 0.15 micrometers of its own average particle diameter size.

14. The method of claim 13 wherein the gelling agent is iron oxide.

15. The method of claim 14 wherein the iron oxide has a density of from about 4.6 to about 5.1 g/cc.

16. The method of claim 15 wherein the weighting material is iron powder having an average particle diameter size of from about 5 to about 50 micrometers.

17. The method of claim 16 wherein cementitious composition further comprises a second weighting material having an average particle diameter size of from about 200 to about 300 micrometers said second weighting agent being selected from the group consisting of iron shot, steel shot, and mixtures thereof.

18. The method recited in claim 17 wherein said second weighting material has an average particle diameter size of from about 4 to about 20 times greater than the average particle diameter size of the first weight material and no more than 10 percent of said second weighting material has a particle size less than 0.15 percent of the average particle diameter size of said second weighting material and at least 90 percent of said second weighting material has a particle size less than 5 times of the average particle diameter size of the second weighting material.

19. The method of claim 18 wherein the second weight material is iron shot.

20. The method of claim 19 wherein said cementitious composition further comprises an amount of a dispersant effective to increase viscosity to a degree sufficient to permit said composition to be pumped into a subterranean oil or gas formation at a speed of at least 50 barrels per minute.

* * * * *